United States Patent [19]

Pflughaupt et al.

[11] 4,260,177
[45] Apr. 7, 1981

[54] MOUNTING ARRANGEMENT FOR INDEPENDENT FRONT WHEEL SUSPENSION OF MOTOR VEHICLES

[75] Inventors: Rolf Pflughaupt, Rüsselsheim; Willi Arnold, Nauheim; Gerhard Hellener, Ginsheim-Gustavsburg, all of Fed. Rep. of Germany

[73] Assignee: General Motors Corporation, Detroit, Mich.

[21] Appl. No.: 46,163

[22] Filed: Jun. 7, 1979

[30] Foreign Application Priority Data

Jun. 19, 1978 [DE] Fed. Rep. of Germany ... 7818309[U]

[51] Int. Cl.³ .............................................. B60F 11/16
[52] U.S. Cl. .................................... 280/668; 267/33; 267/153
[58] Field of Search .................. 280/668, 96.1, 660, 280/662, 673, 674, 696; 188/321; 267/33, 63 R, 153

[56] References Cited

U.S. PATENT DOCUMENTS

| | | | |
|---|---|---|---|
| 2,967,066 | 1/1961 | Mueller | 280/668 |
| 3,941,401 | 3/1976 | Allison | 280/673 |
| 4,084,837 | 4/1978 | Milner | 280/668 |
| 4,132,430 | 1/1979 | Bantle | 280/673 |
| 4,175,770 | 11/1979 | Draisbach et al. | 280/668 |

FOREIGN PATENT DOCUMENTS

| | | | |
|---|---|---|---|
| 569935 | 1/1959 | Belgium | 280/668 |
| 2009857 | 10/1971 | Fed. Rep. of Germany | 280/660 |
| 2656707 | 6/1978 | Fed. Rep. of Germany | 280/668 |

OTHER PUBLICATIONS

"Macpherson Strut Suspensions", Motor Age Magazine, Sep. 1976, pp. 61-64.

Primary Examiner—John J. Love
Assistant Examiner—Ross Weaver
Attorney, Agent, or Firm—F. J. Fodale

[57] ABSTRACT

An independent front wheel suspension for motor vehicles has a support strut which includes a telescopic shock absorber and an enclosed coil spring which serves as the wheel spring. The piston rod of the telescopic shock absorber either alone or together with an upper wheel spring plate is resiliently supported at the vehicle body by a mounting arrangement having an annular elastomeric element. Several coupled and decoupled designs of mounting arrangements are disclosed. Each of the arrangements is characterized by an annular elastomeric element having a substantially axially aligned recess means in at least one of its two end faces for improved cardanic movability.

9 Claims, 7 Drawing Figures

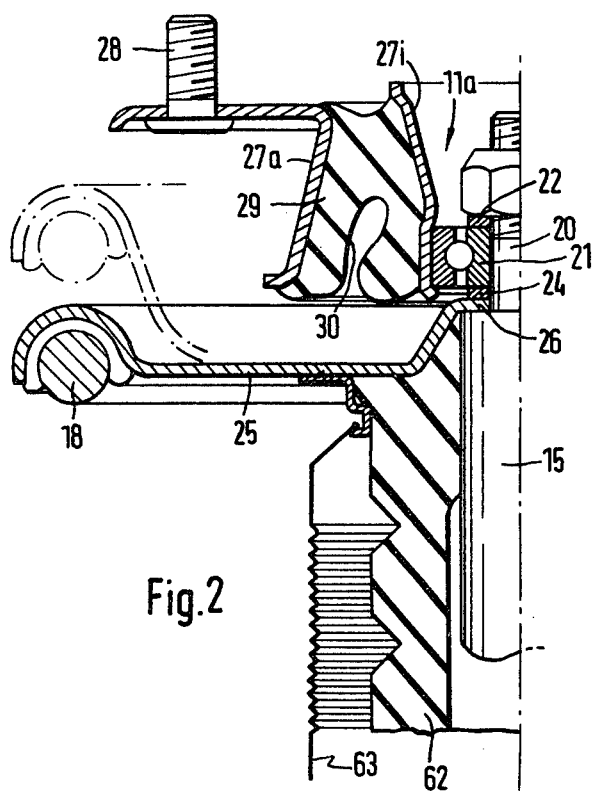
Fig.2
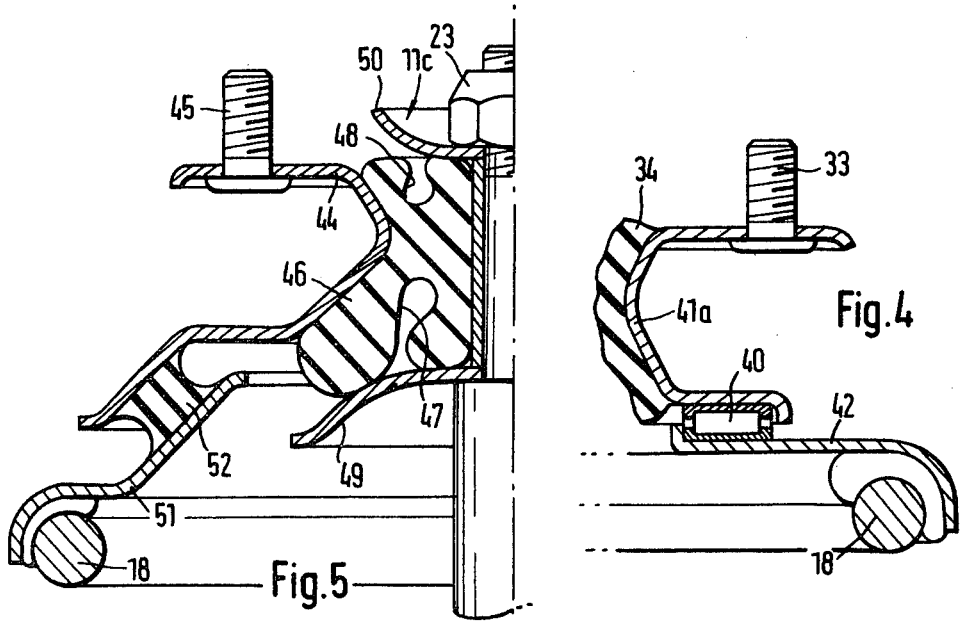
Fig.4
Fig.5

MOUNTING ARRANGEMENT FOR INDEPENDENT FRONT WHEEL SUSPENSION OF MOTOR VEHICLES

This invention relates to a mounting arrangement for an independent front wheel suspension of motor vehicles having a support strut comprising a telescopic shock absorber and a surrounding coil wheel spring, the piston rod of the telescopic shock absorber being flexibly supported on the vehicle frame by an annular rubber member alone or together with the upper wheel spring plate.

Because of the steering movements of the wheels taking place around the steering axis, it is necessary that a mounting arrangement in which the upper spring plate of the wheel spring is connected with the piston rod of the shock absorber provide for a turning movement between the piston rod, on the one hand, and the frame, on the other hand (coupled design). On the other hand, it is also known that the shock absorber and wheel spring can be supported on the frame independently of each other (decoupled design). In this case, separate turning possibilities must be provided for the two parts. In the case of the shock absorber, the turning angle occurring between the shock absorber housing and piston rod or frame during a steering movement of the wheels, can be accommodated between the shock absorber piston and the shock absorber cylinder. For the purpose of reducing friction, however, it might be of advantage to mount a bearing member between piston rod and frame.

Naturally, the resistance to turning should be minimum in the interest of minimal additional steering effort. For this purpose, it is known that sliding disks or (and this is even more favorable for the aforementioned purpose) roller bearings can be built in between shock absorber and the upper spring plate, on the one hand, and vehicle frame, on the other.

Moreover, the kinematics of strut guidance of the wheel, particularly when shock absorber axis and steering axis deviate from each other, require a universal joint type of mobility of the mounting arrangement between strut and vehicle frame (angular mobility of the shock absorber to the plane of the mount). The present invention deals primarily with this problem.

In strut front axles, the spatial steering axis (depending on kingpin angle and caster) and shock absorber axis or effective shock absorber line often do not coincide. Consequently, so-called cardanic constraint occurs in the mounting arrangements of the prior art during wheel deflection. As a consequence, a radial prestress is produced on the rubber member in the mounting arrangement in addition to the prestress on the rubber member produced by the wheel load. The cardanic constraints influence the expended steering effort in a negative way and the additional radial prestress impairs the response of the rubber damping member (and thus riding comfort). The larger the angle between spatial steering axis and shock absorber axis, the greater will be the cardanic constraints in the mounting arrangement during wheel deflection. In addition to the cardanic constraints caused by the wheel deflection, this force component is further reinforced by the excessive tilt of the frame (change of kingpin angle and caster) during travel in curves at higher transverse accelerations.

The object of this invention is to design a mounting arrangement of the type specified above in such a way that an improvement of cardanic (universal joint) flexibility (and thus extensive absence of constraints) is realized during wheel deflection; i.e. the shock absorber, and especially the piston rod of the shock absorber, should not be under additional bending forces because of the wheel deflection.

Accordingly, the invention consists of the fact that the rubber member has axial or essentially axial indentations having an approximate slot shape in cross section on at least one of its two end faces. The slot like indentations, which are advisably expanded in the interior of the rubber member, can be continuous, interrupted or designed as individual recesses arranged in succession and preferably in equidistant distribution in the circumferential direction.

As a result of the slot like indentations of the invention, the required cardanic flexibility of the mounting arrangement relative to the vehicle frame is obtained to a high degree during steering corrections of the vehicle. The size and shape of the slot like indentations in the rubber component depend specifically on the engineering design of the mounting arrangement, the front axle load of the vehicle as well as on appropriate empirical adjustments.

In addition to the mentioned dimensioning and shaping of the slot like indentations, these can be covered with an intermediate textile or wire fabric, inside the rubber member.

The invention will now be illustrated on the basis of practical examples in the drawing and explained more fully in the following description of these examples.

FIG. 2 is an enlarged vertical section of the mounting arrangement shown in FIG. 1;

FIG. 4 is a vertical section of a mounting arrangement similar to FIG. 3 but with a pivot bearing on the upper wheel spring plate;

FIG. 5 is a view similar to FIGS. 2–4 showing another embodiment of a decoupled mounting arrangement;

Figure 1:
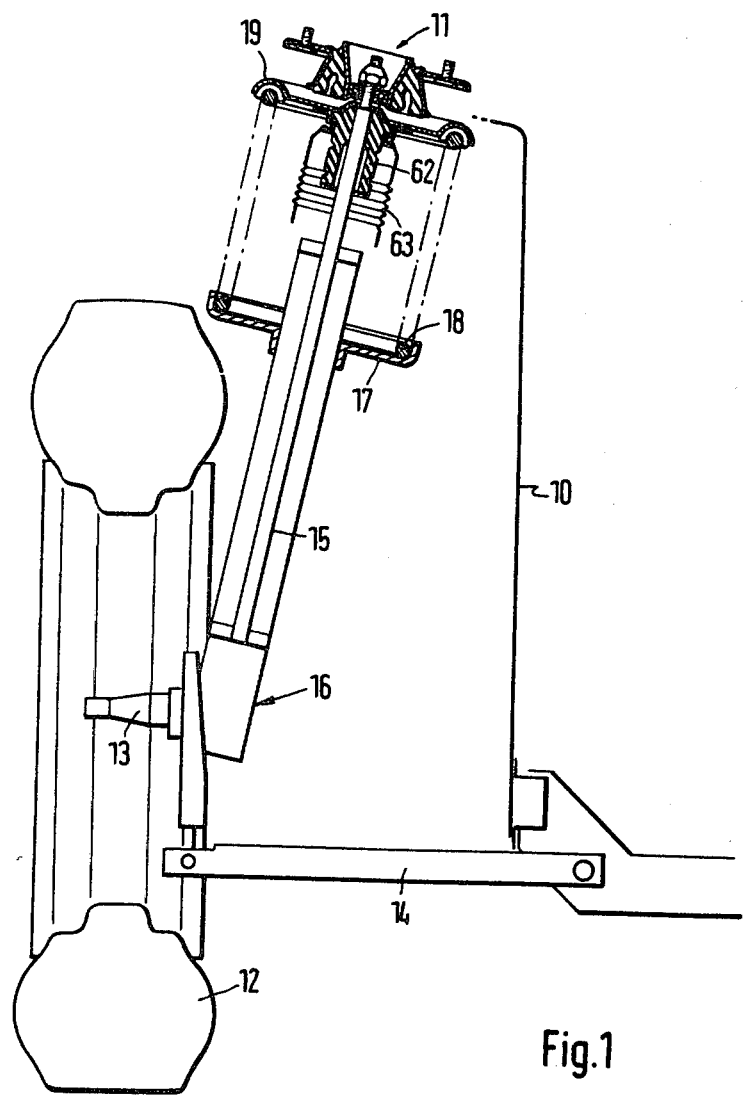
FIG. 1 is a schematic overall view of a telescopic strut-wheel suspension with a mounting arrangement of coupled design according to the invention.

The wheel arch 10 in fixed connection with the vehicle frame is shown in FIG. 1. A wheel 12 which can be steered is supported on a steering knuckle 13 which is guided on the vehicle frame by means of a control arm 14 and a shock absorber 16 having an internally sliding shock absorber piston rod 15 rigidly connected to the wheel bracket.

A lower spring plate 17 is rigidly connected with the housing of the telescopic shock absorber 16 and represents the support for one end of a coil spring 18 forming the respective wheel spring. The lower spring plate 17 is thus carried by the housing of the telescopic shock absorber 16. An upper wheel spring plate 19 forms the upper support of the wheel spring 18.

A rebound stop designated by 62 is connected with the piston rod 15 and the upper spring plate 25. A rubber bellows 63 is provided to protect the piston rod from dirt.

The flexible mounting arrangement by means of which the support strut consisting of telescopic shock absorber 16 and coil spring 18 finds support on the vehicle frame is designated by 11 as a unit. The structure of this flexible mounting arrangement 11 is the essential object of the present invention. Various possible designs of the mounting arrangement 11 are shown in FIGS. 2-7.

Figure 3:
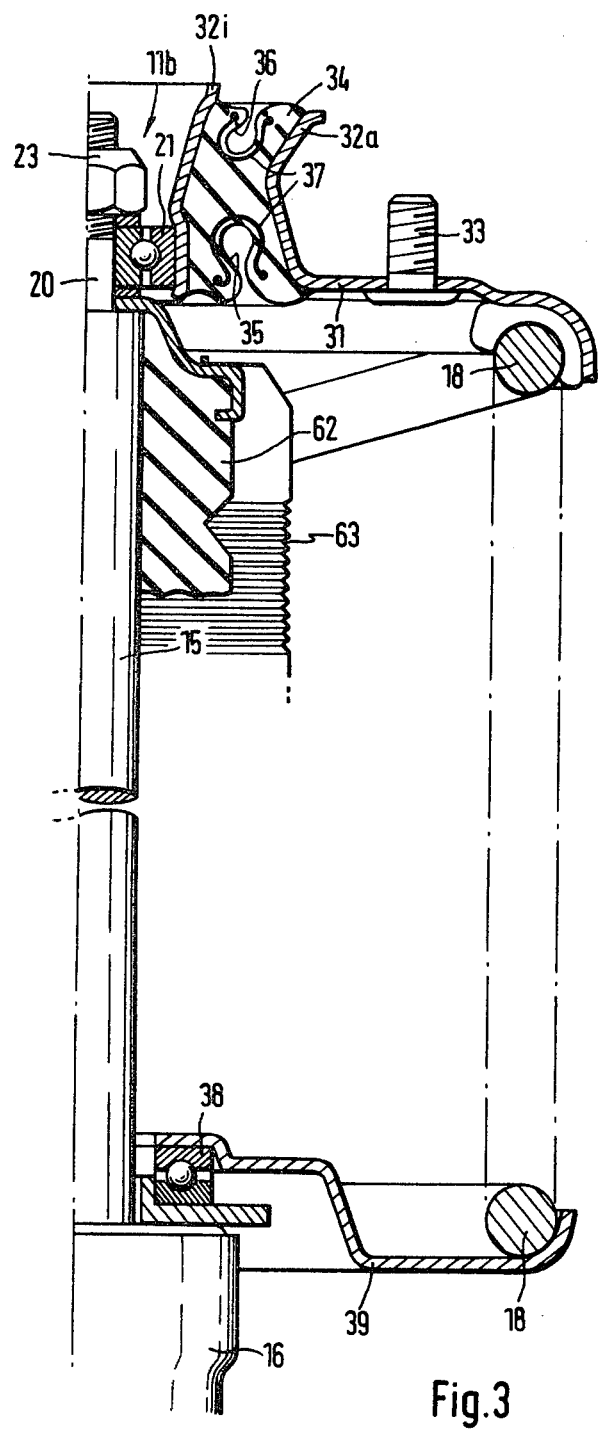
FIG. 3 is a view similar to FIG. 2 showing a mounting arrangement of decoupled design according to the invention.

In the designs of the mounting arrangements 11a and 11b according to FIGS. 2 and 3, the piston rod 15 has a reduced diameter shank 20 onto which a radial ball bearing 21 is placed and fastened by means of washers 22 and 24 and screw nut 23.

In the version of FIG. 2, the radial ball bearing 21 together with washer 24 at the same time represents the upper counterbearing of the upper wheel spring plate designated by 25. On the bottom, the upper wheel spring plate 25 is supported on a shoulder 26 of the piston rod 15.

The radial ball bearing 21 is supported by its outer race on an inner metallic shell 27i of the mounting arrangement 11a. The outer metallic shell 27a is mounted to the vehicle frame (which is not shown in FIG. 2) by means of screws 28. Thus, easy rotation of the telescopic shock absorber piston rod 15 relative to the inner shell 27i and thus also to the vehicle frame is made possible so that the efforts to be expended during the steering process are considerably reduced.

As can be seen from FIG. 2, the inner and outer shells 27i and 27a, designed in annular form, form a housing which encloses a correspondingly annular elastomeric or rubber member 29. The rubber member 29 serves to absorb the wheel forces applied on the wheel assembly via the telescopic shock absorber rod 15. The rubber member 29 is vulcanized to the shells 27i and 27a and is designed as a so-called rubber thrust damper. Its task is not only to transmit damped strut forces into the vehicle frame. Instead, it is also intended to provide for maximum cardanic (joint) flexibility of the strut relative to the vehicle frame during the steering process, so that the forces to be used for steering are considerably reduced and the shock absorber in addition and especially its piston rod are not subjected to such a high bending stress. The desired cardanic flexibility of the mounting arrangement 11a is essentially realized by the fact that the rubber member 29 has a deep slot like indentation 30 extending into the rubber member 29 from the bottom. This may represent either an annular closed circumferential indentation or several single indentations arranged in succession at equal distances in the circumferential direction of the rubber member 29.

In the version of the mounting arrangement 11a according to FIG. 2, a so-called coupled arrangement is involved, i.e. the damper forces and wheel spring forces are transmitted together into the vehicle frame (via the rubber member 29 and the shells 27i and 27a).

Another design of the upper spring plate which realizes a gain in spring length is shown in dash-dot lines.

In contrast, FIG. 3 shows a so-called decoupled design of a mounting arrangement 11b. Here, the upper wheel spring plate designated by 31 together with the shell 32a form a common member which is connected with the vehicle frame by screws 33. In this version, damper forces and wheel spring forces are transmitted separately into the vehicle frame.

The rubber member designated by 34 in the version of FIG. 3 is also vulcanized to the bearing shells 32i and 32a and has a similar design as in the version of FIG. 2; however, in contrast to the latter, it has bilateral slot like indentations 35, 36 which are greatly expanded on the inside. A further difference compared to FIG. 2 consists of the fact that the indentations 35, 36 are covered by wire or textile fabric casings 37 within the rubber member 34. This results in improved durability of the rubber member 34.

In the decoupled version of the single-thrust bearing 11b according to FIG. 3, a possibility must be provided for rotatability of spring 18 relative to the telescopic shock absorber 16. As shown by FIG. 3, this can be realized by a ball thrust bearing 38 by means of which the lower wheel spring plate 39 is supported on shock absorber 16. An alternative of this is shown in FIG. 4. Here the lower wheel spring plate, for example as shown in FIG. 1, can be rigidly connected with the shock absorber housing. An axial roller bearing 40 installed between the outer mounting arrangement shell 41a and the upper wheel spring plate designated by 42 in this case provides for the required rotatability of the spring relative to the shock absorber.

The version in FIG. 5 shows another decoupled mounting arrangement 11c where the wheel spring forces generated by the telescopic shock absorber and its piston rod 15 on the mounting arrangement 11c, on the one hand, and by wheel spring 18, on the other hand, are transmitted separately via the metallic shell 44 and mounting screws 45 into the vehicle frame (not shown). The rubber member 46 placed into the metallic shell 44 has a similar design as in the version according to FIG. 3, exhibiting indentations 47, 48 entering on both end faces. The rubber member 46 is designed as a so-called button pad and thus is not vulcanized into the housing. It is bilaterally bounded in the axial direction by plate-like housing components 49, 50.

A special characteristic of the version of FIG. 5 consists of the fact that the upper wheel spring plate 51 is vulcanized onto the thrust bearing shell 44 at an angle of about 45° to the horizontal by means of a rubber insert 52. The biconcave shape of the rubber insert 52 provides cardanic flexibility for the upper spring plate 51 relative to the shell 44, while the cardanic flexibility of the telescopic shock absorber piston rod 15 is obtained by the rubber member 46 provided with indentations 47, 48 on both end faces.

The required rotatability of the wheel spring 18 relative to the shock absorber housing (not shown) can be realized by a ball thrust bearing located at the lower wheel spring plate in accordance with FIG. 3.

Figure 6:
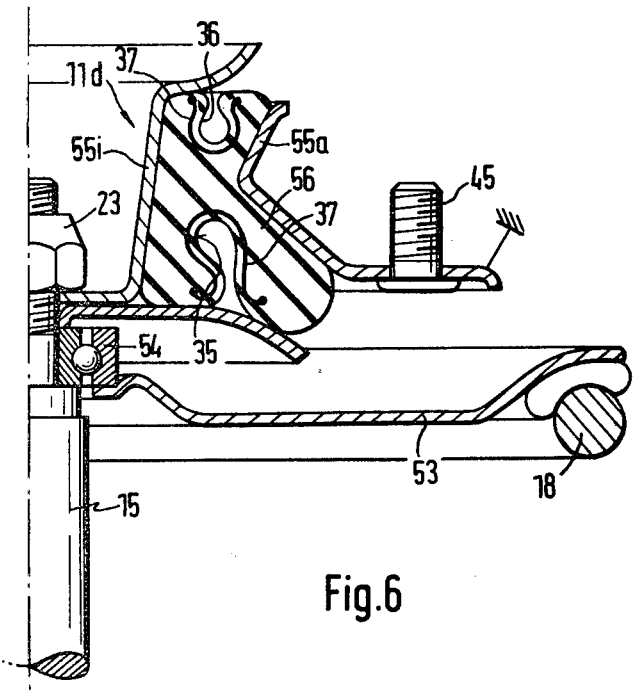
FIG. 6 is a vertical section showing yet another embodiment of a coupled mounting arrangement.

FIG. 6 shows another mounting arrangement 11d of coupled design, where the upper wheel spring plate designated by 53 in this case is rotatably supported on the piston rod 15 of the telescopic shock absorber via a radial ball bearing 54. A rubber member 56 enclosed by a thrust bearing shell 55i and 55a is designed in accordance with the design of member 46 of FIG. 5 but with a textile or wire fabric casing 37 of slots 36, 35. The damper forces are again transmitted into the vehicle frame via screws 45.

Figure 7:
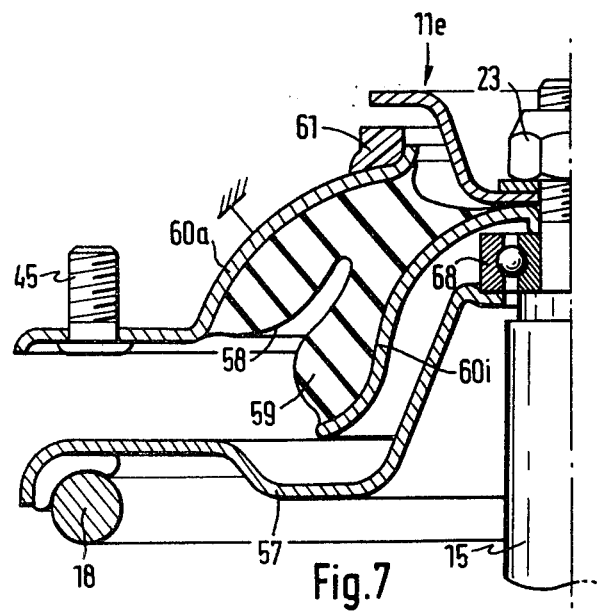
FIG. 7 is a vertical section showing a further embodiment of a coupled mounting arrangement.

In the version of FIG. 7 the upper wheel spring plate, designated by 57 here, is also directly supported on the piston rod 15 of the telescopic shock absorber via a radial ball bearing 68, so that a so-called coupled design of a mounting arrangement 11e is also involved here. The housing shells 60a and 60i enclosing a rubber member 59 provided with indentations 58 on one side is joined to the vehicle frame (not shown) on its outer shell 60a again by means of screws 45. The damper rubber member 59 receives primarily tensile and compressive loads because it is vulcanized into the thrust bearing housing 60 and because of its position. Excessive elongation in the tensile direction of the damping member is prevented by a plastic stop 61 mounted at the top of the thrust bearing shell 60. It is also possible to design the rubber member 59 as a loose molded rubber ring.

The embodiments of the invention in which an exclusive property or privilege is claimed are defined as follows:

1. In a mounting arrangement for an independent front wheel suspension for motor vehicles, having a support strut including a telescopic shock absorber and a coiled spring enclosing the latter, and serving as a wheel spring, wherein an end of the piston rod of the telescopic shock absorber, either alone or together with an upper wheel spring plate, is resiliently supported at the vehicle body by an annular elastomeric element of the mounting arrangement, the improvement comprising: said annular elastomeric element having substantially axially aligned recess means in at least one of its two end faces for improved cardanic movability, said axially aligned recess means being approximately slot shaped in section and of expanded shape at the interior of the elastomeric element.

2. The improvement as defined in claim 1 wherein the recess means is a continuous annular slot.

3. The improvement as defined in claim 1 wherein the recess means is a plurality of circumferentially spaced cavities.

4. In a mounting arrangement for an independent front wheel suspension for motor vehicles, having a support strut including a telescopic shock absorber and a coiled spring enclosing the latter, and serving as a wheel spring, wherein an end of the piston rod of the telescopic shock absorber, either alone or together with an upper wheel spring plate, is resiliently supported at the vehicle body by an annular elastomeric element, the improvement comprising: said annular elastomeric element having substantially axially aligned recess means in each of its two end faces for improved cardanic movability, said axially aligned recess means being approximately slot shaped in section and of expanded shape at the interior of the elastomeric element.

5. The improvement as defined in claim 4 wherein the recess means are enveloped by a textile or wire fabric within the elastomeric element.

6. The improvement as defined in claim 4 wherein the elastomeric element is disposed in a two part housing and wherein the upper wheel spring plate has an inner upwardly bent portion which forms the outer part of the housing enclosing the elastomeric element.

7. The improvement as defined in claim 6 wherein a roller bearing is arranged between the inner part of the housing and the shock absorber piston rod.

8. The improvement as defined in claim 4 wherein the elastomeric element is disposed in a housing, which bears on the upper wheel spring plate at an angle of about 45°, via an elastomeric insert of biconcave shape.

9. The improvement as defined in claim 4 wherein the elastomeric element is disposed in a housing which bears on the upper wheel spring plate via a roller thrust bearing.

* * * * *